(12) United States Patent
Stapp et al.

(10) Patent No.: US 12,134,154 B2
(45) Date of Patent: Nov. 5, 2024

(54) SUBMERGED ARC WELDING SYSTEMS AND SUBMERGED ARC WELDING TORCHES TO RESISTIVELY PREHEAT ELECTRODE WIRE

(71) Applicant: Illinois Tool Works Inc., Glenview, IL (US)

(72) Inventors: Zakary Stapp, Greenville, WI (US); Jake Zwayer, Appleton, WI (US); Aniruddha Bhide, Neenah, WI (US); Valarie Schwartz, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 18/322,141

(22) Filed: May 23, 2023

(65) Prior Publication Data
US 2024/0017343 A1    Jan. 18, 2024

Related U.S. Application Data

(63) Continuation of application No. 16/556,969, filed on Aug. 30, 2019, now Pat. No. 11,654,503.
(Continued)

(51) Int. Cl.
*B23K 9/18* (2006.01)
*B23K 9/10* (2006.01)
(Continued)

(52) U.S. Cl.
CPC ............ *B23K 9/186* (2013.01); *B23K 9/1068* (2013.01); *B23K 9/1093* (2013.01); *B23K 9/14* (2013.01); *B23K 9/285* (2013.01)

(58) Field of Classification Search
CPC .... B23K 9/1068; B23K 9/1093; B23K 9/123; B23K 9/14; B23K 9/182; B23K 9/186; B23K 9/285
(Continued)

(56) References Cited

U.S. PATENT DOCUMENTS 2,365,958 A    12/1944  Holslag
2,416,047 A    2/1947   Dolan
(Continued)

FOREIGN PATENT DOCUMENTS

AT    413801     6/2006
CA    2072711    12/1992
(Continued)

OTHER PUBLICATIONS

"ALT 304," Miller—The Power of Blue, Jun. 2001.
(Continued)

*Primary Examiner* — Dana Ross
*Assistant Examiner* — James F Sims, III
(74) *Attorney, Agent, or Firm* — McAndrews, Held & Malloy, Ltd.

(57) ABSTRACT

Submerged arc welding torches and systems to resistively preheat electrode wire are disclosed. A disclosed example submerged arc welding torch includes: a first contact tip configured to transfer weld current and preheating current to the wire; a second contact tip configured to conduct the preheating current to the wire; an air-cooled first conductive body portion configured to receive the weld current and to conduct the weld current and the preheating current to the first contact tip; an air-cooled second conductive body portion configured to receive the preheating current and to conduct the preheating current to the second contact tip; and an insulator coupled between the first and second conductive body portions.

18 Claims, 6 Drawing Sheets

Related U.S. Application Data

(60) Provisional application No. 62/726,190, filed on Aug. 31, 2018.

(51) Int. Cl.
*B23K 9/14* (2006.01)
*B23K 9/28* (2006.01)

(58) Field of Classification Search
USPC .......................................................... 219/73
See application file for complete search history.

(56) References Cited

U.S. PATENT DOCUMENTS

| | | | |
|---|---|---|---|
| 2,976,462 A | 3/1961 | Miller | |
| 3,030,495 A | 4/1962 | Anderson | |
| 3,288,982 A | 11/1966 | Haruyoshi | |
| 3,549,857 A | 12/1970 | Carter | |
| 3,725,629 A | 4/1973 | Vickers | |
| 3,809,853 A | 5/1974 | Manz | |
| 3,849,871 A | 11/1974 | Kaunitz | |
| 3,946,349 A | 3/1976 | Haldeman | |
| 4,160,967 A | 7/1979 | Beech | |
| 4,188,419 A | 2/1980 | Detert | |
| 4,222,023 A | 9/1980 | Beech | |
| 4,329,561 A | 5/1982 | Schafer | |
| 4,426,565 A | 1/1984 | Rueter | |
| 4,447,703 A | 5/1984 | Stol | |
| 4,467,176 A | 8/1984 | Mizuno | |
| 4,493,971 A | 1/1985 | Nawa | |
| 4,531,040 A | 7/1985 | Nawa | |
| 4,536,634 A | 8/1985 | Nawa | |
| 4,546,234 A | 10/1985 | Ogasawara | |
| 4,547,654 A | 10/1985 | Stol | |
| 4,580,026 A | 4/1986 | Stol | |
| 4,590,358 A | 5/1986 | Stol | |
| 4,614,856 A | 9/1986 | Hori | |
| 4,628,182 A | 12/1986 | Hori | |
| 4,631,385 A | 12/1986 | Rothermel | |
| 4,667,083 A | 5/1987 | Stol | |
| 4,675,494 A | 6/1987 | Dilay | |
| 4,728,761 A | 3/1988 | Mucha | |
| 4,897,523 A | 1/1990 | Parks | |
| 4,950,348 A | 8/1990 | Larsen | |
| 4,954,691 A | 9/1990 | Parks | |
| 4,973,821 A | 11/1990 | Martin | |
| 5,043,557 A | 8/1991 | Tabata | |
| 5,086,207 A | 2/1992 | Deam | |
| 5,101,086 A | 3/1992 | Dion | |
| 5,118,028 A | 6/1992 | Ogawa | |
| 5,140,123 A | 8/1992 | Mitani | |
| 5,148,001 A | 9/1992 | Stava | |
| 5,208,433 A | 5/1993 | Hellegouarc | |
| 5,270,516 A | 12/1993 | Hamamoto | |
| 5,278,390 A | 1/1994 | Blankenship | |
| 5,315,089 A | 5/1994 | Hughes | |
| 5,319,179 A | 6/1994 | Joecks | |
| 5,343,023 A | 8/1994 | Geissler | |
| 5,349,156 A | 9/1994 | Madigan | |
| 5,352,871 A | 10/1994 | Ross | |
| 5,367,138 A | 11/1994 | Moss | |
| 5,412,184 A | 5/1995 | McGaffigan | |
| 5,461,215 A | 10/1995 | Haldeman | |
| 5,466,916 A | 11/1995 | Iguchi | |
| 5,504,309 A | 4/1996 | Geissler | |
| 5,526,561 A | 6/1996 | McGaffigan | |
| 5,644,461 A | 7/1997 | Miller | |
| 5,710,413 A | 1/1998 | King | |
| 5,714,738 A | 2/1998 | Hauschulz | |
| 5,739,506 A | 4/1998 | Hanton | |
| 5,742,029 A | 4/1998 | Stava | |
| 5,756,967 A | 5/1998 | Quinn et al. | |
| 5,760,373 A | 6/1998 | Colling | |
| 5,773,799 A | 6/1998 | Maxfield | |
| 5,783,799 A | 7/1998 | Geissler | |
| 5,844,193 A | 12/1998 | Nomura | |
| 5,963,022 A | 10/1999 | Buda | |
| 5,968,587 A | 10/1999 | Frankel | |
| 5,994,659 A | 11/1999 | Offer | |
| 6,002,104 A | 12/1999 | Hsu | |
| 6,008,470 A | 12/1999 | Zhang | |
| 6,043,471 A | 3/2000 | Wiseman | |
| 6,051,810 A | 4/2000 | Stava | |
| 6,077,369 A | 6/2000 | Kusano | |
| 6,090,067 A | 7/2000 | Carter | |
| 6,107,602 A | 8/2000 | Geissler | |
| 6,115,273 A | 9/2000 | Geissler | |
| 6,160,241 A | 12/2000 | Stava | |
| 6,169,263 B1 | 1/2001 | Derby | |
| 6,204,476 B1 | 3/2001 | Reynolds | |
| 6,248,976 B1 | 6/2001 | Blankenship | |
| 6,259,059 B1 | 7/2001 | Hsu | |
| 6,265,688 B1 | 7/2001 | Lyshkow | |
| 6,274,845 B1 | 8/2001 | Stava | |
| 6,278,074 B1 | 8/2001 | Morlock | |
| 6,292,715 B1 | 9/2001 | Rongo | |
| 6,331,694 B1 | 12/2001 | Blankenship | |
| 6,359,258 B1 | 3/2002 | Blankenship | |
| 6,479,792 B1 | 11/2002 | Beiermann | |
| 6,486,439 B1 | 11/2002 | Spear et al. | |
| 6,515,259 B1 | 2/2003 | Hsu | |
| 6,559,416 B1 | 5/2003 | Steenis | |
| 6,583,386 B1 | 6/2003 | Ivkovich | |
| 6,596,970 B2 | 7/2003 | Blankenship | |
| 6,624,388 B1 | 9/2003 | Blankenship et al. | |
| 6,642,482 B2 | 11/2003 | Rappl | |
| 6,670,579 B2 | 12/2003 | Davidson et al. | |
| 6,707,001 B1 | 3/2004 | Ulrich | |
| 6,710,297 B1 | 3/2004 | Artelsmair | |
| 6,720,529 B2 | 4/2004 | Davidson | |
| 6,744,012 B2 | 6/2004 | Ueda | |
| 6,747,247 B2 | 6/2004 | Holverson | |
| 6,849,828 B2 | 2/2005 | Aigner | |
| 6,906,284 B2 | 6/2005 | Kim | |
| 6,909,067 B2 | 6/2005 | Davidson | |
| 6,933,466 B2 | 8/2005 | Hutchison | |
| 6,958,263 B2 | 10/2005 | Bhattacharyya | |
| 6,974,931 B2 | 12/2005 | Holverson | |
| 6,974,932 B2 | 12/2005 | Holverson | |
| 6,995,338 B2 | 2/2006 | Hutchison | |
| 7,002,103 B2 | 2/2006 | Holverson | |
| 7,129,443 B2 | 10/2006 | Davidson | |
| 7,145,101 B2 | 12/2006 | Tong | |
| 7,244,905 B2 | 7/2007 | Das | |
| 7,265,320 B2 | 9/2007 | Ou | |
| 7,304,269 B2 | 12/2007 | Fulmer | |
| 7,307,240 B2 | 12/2007 | Holverson | |
| 7,351,933 B2 | 4/2008 | Huismann | |
| 7,381,923 B2 | 6/2008 | Gordon et al. | |
| 7,683,290 B2 | 3/2010 | Daniel | |
| 8,203,100 B2 | 6/2012 | Ueda | |
| 8,288,686 B2 | 10/2012 | Kaufman | |
| 8,487,215 B2 | 7/2013 | Holverson | |
| 9,095,928 B2 | 8/2015 | Ash | |
| 9,162,312 B2 | 10/2015 | Ma | |
| 9,193,004 B2 | 11/2015 | Enyedy et al. | |
| 9,403,231 B2 | 8/2016 | Hutchison | |
| 9,409,250 B2 | 8/2016 | Daniel | |
| 9,539,662 B2 | 1/2017 | Hutchison | |
| 9,950,383 B2 | 4/2018 | Davidson | |
| 10,406,621 B2 | 9/2019 | Salsich | |
| 10,675,699 B2 | 6/2020 | Hsu | |
| 10,786,861 B2* | 9/2020 | Hung | B23K 9/296 |
| 10,843,288 B2 | 11/2020 | Salsich | |
| 11,007,597 B2 | 5/2021 | Salsich | |
| 2002/0008095 A1 | 1/2002 | Norrish | |
| 2002/0045970 A1 | 4/2002 | Krause | |
| 2002/0107825 A1 | 8/2002 | Manicke | |
| 2002/0117487 A1 | 8/2002 | Corby | |
| 2002/0117488 A1 | 8/2002 | Arndt | |
| 2003/0010756 A1 | 1/2003 | Enyedy | |
| 2003/0058149 A1 | 3/2003 | Jayadeva | |
| 2004/0010342 A1 | 1/2004 | Thelen | |
| 2004/0069759 A1 | 4/2004 | Davidson | |

(56) References Cited

U.S. PATENT DOCUMENTS

| | | |
|---|---|---|
| 2004/0182828 A1 | 9/2004 | Schmidt |
| 2004/0222204 A1 | 11/2004 | Hutchison |
| 2004/0238511 A1 | 12/2004 | Matus |
| 2005/0184039 A1 | 8/2005 | Stava |
| 2005/0218132 A1 | 10/2005 | Wells |
| 2005/0269306 A1 | 12/2005 | Fulmer |
| 2006/0138115 A1 | 6/2006 | Norrish |
| 2006/0163227 A1 | 7/2006 | Hillen |
| 2006/0163229 A1 | 7/2006 | Hutchison |
| 2007/0039935 A1 | 2/2007 | Justice |
| 2007/0051711 A1 | 3/2007 | Kachline |
| 2007/0084840 A1 | 4/2007 | Davidson |
| 2007/0102407 A1 | 5/2007 | Uezono |
| 2007/0170163 A1 | 7/2007 | Narayanan |
| 2007/0235434 A1 | 10/2007 | Davidson |
| 2007/0267394 A1 | 11/2007 | Beck |
| 2008/0264916 A1 | 10/2008 | Nagano |
| 2008/0264917 A1 | 10/2008 | White |
| 2008/0264923 A1 | 10/2008 | White |
| 2009/0026188 A1 | 1/2009 | Schorghuber |
| 2009/0039066 A1 | 2/2009 | Centner |
| 2009/0173726 A1 | 7/2009 | Davidson et al. |
| 2010/0059493 A1 | 3/2010 | Mcaninch |
| 2010/0096373 A1 | 4/2010 | Hillen |
| 2010/0096436 A1 | 4/2010 | Nangle |
| 2010/0133250 A1 | 6/2010 | Sardy |
| 2010/0176104 A1 | 7/2010 | Peters |
| 2010/0308026 A1 | 12/2010 | Vogel |
| 2010/0308027 A1 | 12/2010 | Vogel |
| 2010/0314371 A1 | 12/2010 | Davidson |
| 2011/0108527 A1 | 5/2011 | Peters |
| 2011/0114612 A1 | 5/2011 | Holverson |
| 2011/0163080 A1 | 7/2011 | Beck |
| 2011/0204034 A1 | 8/2011 | Schartner |
| 2011/0297658 A1 | 8/2011 | Peters |
| 2011/0248007 A1 | 10/2011 | Takeda |
| 2011/0266269 A1 | 11/2011 | Kachline |
| 2012/0024828 A1 | 2/2012 | Oowaki |
| 2012/0061362 A1 | 3/2012 | Davidson |
| 2012/0074112 A1 | 3/2012 | Kotera |
| 2012/0097655 A1 | 4/2012 | Daniel |
| 2012/0248080 A1 | 10/2012 | Hutchison |
| 2012/0285932 A1 | 11/2012 | Yuan |
| 2012/0291172 A1 | 11/2012 | Wills |
| 2012/0298642 A1 | 11/2012 | Lambert |
| 2013/0112674 A1 | 5/2013 | Mnich |
| 2013/0112676 A1 | 5/2013 | Hutchison |
| 2013/0213942 A1 | 8/2013 | Peters |
| 2013/0256276 A1 | 10/2013 | Fisher |
| 2013/0264323 A1 | 10/2013 | Daniel |
| 2013/0270245 A1 | 10/2013 | Holverson |
| 2014/0008328 A1 | 1/2014 | Enyedy |
| 2014/0008331 A1 | 1/2014 | Ogborn |
| 2014/0008339 A1 | 1/2014 | Ogborn |
| 2014/0008343 A1 | 1/2014 | Ash |
| 2014/0008344 A1 | 1/2014 | Enyedy |
| 2014/0008354 A1 | 1/2014 | Pletcher |
| 2014/0021183 A1 | 1/2014 | Peters |
| 2014/0021186 A1 | 1/2014 | Denney |
| 2014/0021187 A1 | 1/2014 | Denney |
| 2014/0021188 A1 | 1/2014 | Denney |
| 2014/0034621 A1 | 2/2014 | Daniel |
| 2014/0034622 A1 | 2/2014 | Barrett |
| 2014/0035279 A1 | 2/2014 | Narayanan |
| 2014/0042129 A1 | 2/2014 | Daniel |
| 2014/0042138 A1 | 2/2014 | Matthews |
| 2014/0048524 A1 | 2/2014 | Ash |
| 2014/0116994 A1 | 5/2014 | Peters |
| 2014/0131321 A1 | 5/2014 | Enyedy |
| 2014/0158669 A1 | 6/2014 | Davidson |
| 2014/0177109 A1 | 6/2014 | Curtis |
| 2014/0183176 A1 | 7/2014 | Hutchison |
| 2014/0217077 A1 | 8/2014 | Davidson |
| 2014/0251965 A1 | 9/2014 | Wiryadinata |
| 2014/0251971 A1 | 9/2014 | Hearn |
| 2014/0263193 A1 | 9/2014 | Denney |
| 2014/0263194 A1 | 9/2014 | Narayanan |
| 2014/0263228 A1 | 9/2014 | Peters |
| 2014/0263229 A1 | 9/2014 | Peters |
| 2014/0263230 A1 | 9/2014 | Peters |
| 2014/0263231 A1 | 9/2014 | Peters |
| 2014/0263234 A1 | 9/2014 | Peters |
| 2014/0263237 A1 | 9/2014 | Daniel |
| 2014/0263241 A1 | 9/2014 | Henry |
| 2014/0263243 A1 | 9/2014 | Marschke |
| 2014/0367370 A1 | 12/2014 | Hutchison |
| 2014/0374391 A1 | 12/2014 | Cole |
| 2015/0001184 A1 | 1/2015 | Cole |
| 2015/0001197 A1 | 1/2015 | Marschke |
| 2015/0014283 A1 | 1/2015 | Peters |
| 2015/0028010 A1 | 1/2015 | Peters |
| 2015/0028011 A1 | 1/2015 | Peters |
| 2015/0028012 A1 | 1/2015 | Peters |
| 2015/0083702 A1 | 3/2015 | Scott |
| 2015/0090703 A1 | 4/2015 | Peters |
| 2015/0105898 A1 | 4/2015 | Adams |
| 2015/0151375 A1 | 6/2015 | Peters |
| 2015/0158105 A1 | 6/2015 | Peters |
| 2015/0158106 A1 | 6/2015 | Peters |
| 2015/0158107 A1 | 6/2015 | Latessa |
| 2015/0158108 A1 | 6/2015 | Peters |
| 2015/0183044 A1 | 7/2015 | Peters |
| 2015/0183045 A1 | 7/2015 | Peters |
| 2015/0209889 A1 | 7/2015 | Peters |
| 2015/0209905 A1 | 7/2015 | Matthews |
| 2015/0209906 A1 | 7/2015 | Denney et al. |
| 2015/0209907 A1 | 7/2015 | Narayanan |
| 2015/0209908 A1 | 7/2015 | Peters |
| 2015/0209910 A1 | 7/2015 | Denney |
| 2015/0209913 A1 | 7/2015 | Denney |
| 2015/0213921 A1 | 7/2015 | Koide |
| 2015/0251275 A1 | 9/2015 | Denney et al. |
| 2015/0273612 A1 | 10/2015 | Peters |
| 2015/0283638 A1 | 10/2015 | Henry |
| 2015/0283639 A1 | 10/2015 | Henry |
| 2016/0144444 A1 | 5/2016 | Davidson |
| 2016/0167151 A1 | 6/2016 | Mehn |
| 2016/0175975 A1 | 6/2016 | Lattner |
| 2016/0199939 A1 | 7/2016 | Hartman |
| 2016/0221105 A1 | 8/2016 | Henry et al. |
| 2016/0288235 A1 | 10/2016 | Davidson |
| 2016/0318112 A1 | 11/2016 | Hutchison |
| 2017/0165778 A1 | 6/2017 | Hsu |
| 2017/0225255 A1 | 8/2017 | Zwayer |
| 2018/0236585 A1 | 8/2018 | Davidson |
| 2018/0333798 A1 | 11/2018 | Uecker |
| 2018/0354057 A1 | 12/2018 | Sigl |
| 2019/0061039 A1 | 2/2019 | Doyle |

FOREIGN PATENT DOCUMENTS

| | | |
|---|---|---|
| CA | 2862671 | 10/2013 |
| CA | 2883947 | 3/2014 |
| CN | 2125475 | 12/1992 |
| CN | 2181354 | 11/1994 |
| CN | 1298778 | 6/2001 |
| CN | 1496774 | 5/2004 |
| CN | 1600486 | 3/2005 |
| CN | 1640603 | 7/2005 |
| CN | 1712168 | 12/2005 |
| CN | 1714978 | 1/2006 |
| CN | 1836818 | 9/2006 |
| CN | 1871093 | 11/2006 |
| CN | 101062530 | 10/2007 |
| CN | 201098775 | 8/2008 |
| CN | 101376191 | 3/2009 |
| CN | 201249331 | 6/2009 |
| CN | 101804495 | 8/2010 |
| CN | 101862886 | 10/2010 |
| CN | 102458749 | 5/2012 |
| CN | 102470473 | 5/2012 |
| CN | 102554418 | 7/2012 |
| CN | 102596475 | 7/2012 |
| CN | 102770228 | 11/2012 |

(56) References Cited

FOREIGN PATENT DOCUMENTS

| | | |
|---|---|---|
| CN | 102825370 | 12/2012 |
| CN | 202639618 | 1/2013 |
| CN | 202824943 | 3/2013 |
| CN | 104093516 | 10/2014 |
| CN | 108472759 | 8/2018 |
| DE | 2501928 | 7/1976 |
| DE | 19808383 | 9/1999 |
| DE | 212004000048 | 6/2006 |
| EP | 0150543 | 8/1985 |
| EP | 0194045 | 9/1986 |
| EP | 0204559 | 12/1986 |
| EP | 0387223 | 9/1990 |
| EP | 0936019 A2 | 8/1999 |
| EP | 0936019 A3 | 3/2001 |
| EP | 1232825 | 8/2002 |
| EP | 2218537 | 8/2010 |
| EP | 2286949 | 2/2011 |
| EP | 2322315 | 5/2011 |
| EP | 2522453 | 11/2012 |
| EP | 2892680 | 7/2015 |
| EP | 2781291 | 10/2015 |
| FR | 1443701 | 6/1966 |
| JP | S5719166 | 2/1982 |
| JP | S57109573 | 7/1982 |
| JP | S583784 | 1/1983 |
| JP | S58119466 | 7/1983 |
| JP | S60108175 | 6/1985 |
| JP | S60108176 | 6/1985 |
| JP | S60170577 | 9/1985 |
| JP | S61186172 | 8/1986 |
| JP | S629773 | 1/1987 |
| JP | S6471575 | 3/1989 |
| JP | S6471575 A | 3/1989 |
| JP | H03285768 | 12/1991 |
| JP | H06277840 | 10/1994 |
| JP | H07204848 | 8/1995 |
| JP | H11156542 | 6/1999 |
| JP | 2001276971 | 10/2001 |
| JP | 2003205385 | 7/2003 |
| JP | 2003311409 | 11/2003 |
| JP | 2005034853 | 2/2005 |
| JP | 2006205189 | 8/2006 |
| JP | 2009072814 | 4/2009 |
| JP | 4950819 | 6/2012 |
| JP | 2014176890 | 9/2014 |
| KR | 1020060133016 | 12/2006 |
| KR | 20080009816 | 1/2008 |
| KR | 20100120562 | 11/2010 |
| KR | 1020120027764 | 3/2012 |
| KR | 101497460 | 3/2015 |
| SU | 872102 | 10/1981 |
| WO | 9640465 | 12/1996 |
| WO | 0132347 | 5/2001 |
| WO | 0153030 | 7/2001 |
| WO | 2005030422 | 4/2005 |
| WO | 2010144688 | 12/2010 |
| WO | 2014140783 | 9/2014 |
| WO | 2015125008 | 8/2015 |

OTHER PUBLICATIONS

"Maxstar 200 SD, DX, and LX," Miller Electric Mfg. Co., Oct. 2003.
Bondy et al., "Graph Theory with Applications," Department of Combinatorics and Optimization, University of Waterloo, 1976, p. 7-8.
Canadian Office Action Appln No. 3,005,408 dated Mar. 19, 2019.
Gupta, "A low temperature hydrogen sensor based on palladium nanoparticles," Published in 2014.
Int'l Search Report and Written Opinion Appln No. PCT/U2019/049109 mailed Dec. 2, 2019 (11 pgs).
Int'l Search Report and Written Opinion Appln No. PCT/US2019/050972, mailed Nov. 14, 2019, (13 pgs).
Int'l Search Report and Written Opinion for PCT/US2016/065265 dated Mar. 14, 2017 (16 pages).
Int'l Search Report and Written Opinion for PCT/US2018/029770 mailed Sep. 12, 2018 (13 pgs.).
Int'l Search Report and Written Opinion for PCT/US2018/035087 mailed Sep. 19, 2018 (15 pgs.).
Int'l Search Report and Written Opinion for PCT/US2018/036852 mailed Oct. 2, 2018 (17 pgs).
Int'l Search Report and Written Opinion for PCT/US2018/036898 mailed Oct. 1, 2018 (14 pgs.).
Int'l Search Report and Written Opinion for PCT/US2018/036900 mailed Oct. 5, 2018 (15 pgs.).
Int'l Search Report and Written Opinion for PCT/US2018/036906 mailed Oct. 1, 2018 (15 pgs.).
Int'l Search Report and Written Opinion for PCT/US2018/036914 mailed Oct. 2, 2018 (14 pgs.).
Int'l Search Report and Written Opinion for PCT/US2018/036915 mailed Oct. 1, 2018 (15 pgs).
Int'l Search Report and Written Opinion for PCT/US2018/036919 mailed Oct. 2, 2018 (13 pgs.).
Int'l Search Report and Written Opinion for PCT/US2018/049888 mailed Feb. 1, 2019 (14 pgs.).
Int'l Search Report and Written Opinion for PCT/US2018/052384 mailed Feb. 12, 2019 (12 pgs.).
International Search Report from PCT application No. PCT/US2014/017864, dated Aug. 22, 2014, 9 pgs.
International Search Report from PCT application No. PCT/US2014/041201, dated Nov. 4, 2014, 11 pg.
International Search Report from PCT application No. PCT/US2014/045872, dated Nov. 4, 2014, 10 pgs.
International Search Report from PCT Application No. PCT/US2014/055529, dated Mar. 6, 2015, 9 pgs.
International Search Report from PCT application No. PCT/US2015/045715, dated Jan. 7, 2016, 12 pgs.
International Search Report from PCT application No. PCT/US2015/055040, dated Feb. 3, 2016, 11 pgs.
International Search Report from PCT application No. PCT/US2015/056121, dated Apr. 4, 2016, 11 pgs.
International Search Report from PCT application No. PCT/US2016/017385, dated Jul. 19, 2016, 13 pgs.
International Search Report from PCT application No. PCT/US2013/073490 dated May 13, 2014, 10 pgs.
International Search Report from PCT application No. PCT/US2013/073863 dated May 2, 2014, 15 pgs.
International Search Report from PCT application No. PCT/US2013/077710 dated May 9, 2014, 12 pgs.
International Search Report from PCT application No. PCT/US2014/014241 dated May 9, 2014, 8 pgs.
Lincoln Electric, "Storing and Redrying Electrodes," Published in 2011.
N.A.: "Drahtgluhe", Aug. 23, 2016 (Aug. 23, 2016), XP055510057, Wikipedia, Retrieved from the Internet: URL:https://de.wikipedia.Org/w/index.php7title=Drahtgl%C3%BChe&oldid=157333005, [retrieved on Sep. 26, 2018], with machine translation, 2 pages.
Non-Final Office Action U.S. Appl. No. 15/343,992 dated Mar. 7, 2019 (18 pgs.).
Non-Final Office Action U.S. Appl. No. 15/498,249 dated Sep. 23, 2019 (43 pgs).
Office Action from U.S. Appl. No. 15/498,249 dated Apr. 20, 2018.
PCT International Search Report & Written Opinion of PCT/US2012/063783 dated Mar. 1, 2013, 12 pages.
PCT, IPRP, issued in connection with PCT/US2018/036898, dated Dec. 19, 2019, 7 pages.
PCT, IPRP, issued in connection with PCT/US2018/036900, dated Dec. 19, 2019, 7 pages.
Pitrun, "The effect of welding parameters on levels of diffusible hydrogen in weld metal deposited using gas shield rutile flux cored wires," Published in 2004.
European Office Action Appln No. 22199347.0 dated Feb. 20, 2023.
European Office Action Appln No. 19769649.5 dated Apr. 26, 2023.

(56) References Cited

OTHER PUBLICATIONS

European Examination Report Appln No. 19769649.5 dated Feb. 7, 2024.

* cited by examiner

SUBMERGED ARC WELDING SYSTEMS AND SUBMERGED ARC WELDING TORCHES TO RESISTIVELY PREHEAT ELECTRODE WIRE

RELATED APPLICATIONS

This patent claims priority to U.S. Provisional Patent Application Ser. No. 62/726,190, filed Aug. 31, 2018, entitled "SUBMERGED ARC WELDING SYSTEMS AND SUBMERGED ARC WELDING TORCHES TO RESISTIVELY PREHEAT ELECTRODE WIRE." The entirety of U.S. Provisional Patent Application Ser. No. 62/726,190 is incorporated herein by reference.

BACKGROUND

This disclosure relates generally to welding and, more particularly, to submerged arc welding systems and submerged arc welding torches to resistively preheat electrode wire.

Welding is a process that has increasingly become ubiquitous in all industries. Welding is, at its core, simply a way of bonding two pieces of metal. A wide range of welding systems and welding control regimes have been implemented for various purposes. In continuous welding operations, metal inert gas (MIG) welding and submerged arc welding (SAW) techniques allow for formation of a continuing weld bead by feeding welding wire shielded by inert gas from a welding torch and/or by flux. Such wire feeding systems are available for other welding systems, such as tungsten inert gas (TIG) welding. Electrical power is applied to the welding wire and a circuit is completed through the workpiece to sustain a welding arc that melts the electrode wire and the workpiece to form the desired weld.

SUMMARY

Submerged arc welding systems and submerged arc welding torches to resistively preheat electrode wire are disclosed, substantially as illustrated by and described in connection with at least one of the figures, as set forth more completely in the claims.

BRIEF DESCRIPTION OF THE DRAWINGS

The figures are not necessarily to scale. Where appropriate, similar or identical reference numbers are used to refer to similar or identical components.

DETAILED DESCRIPTION

Figure 1:
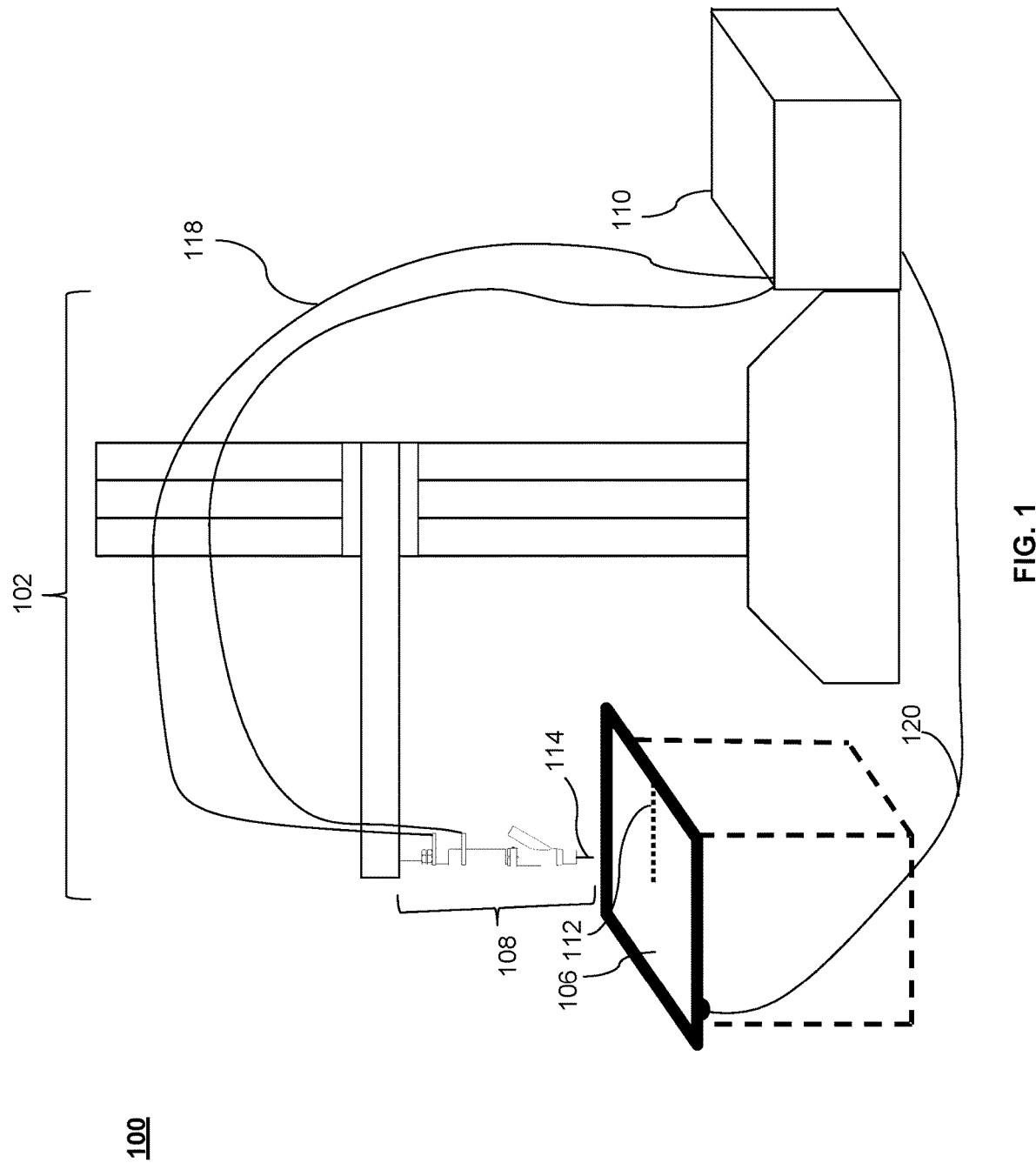
FIG. 1 illustrates an example mechanized welding system in which a manipulator is used to weld a workpiece using a submerged arc welding process.

For the purpose of promoting an understanding of the principles of this disclosure, reference will be now made to the examples illustrated in the drawings and specific language will be used to describe the same. It will nevertheless be understood that no limitation of the scope of the claims is intended by this disclosure. Modifications in the illustrated examples and such further applications of the principles of this disclosure as illustrated therein are contemplated as would typically occur to one skilled in the art to which this disclosure relates.

Disclosed submerged arc welding torches provide both preheating current and welding current to an electrode wire. Some example submerged arc welding torches provide resistive preheating of the electrode wire, while being capable of retrofit into a system previously using conventional submerged arc welding torches. Disclosed example submerged arc welding torches include an insulator to enable the torch to provide a current path through the electrode wire as the electrode wire is fed through the submerged arc welding torch. In some examples, the submerged arc welding torch provides resistive preheating while limiting changes to the form factor of conventional torches to adding only an additional power connector to an outside of the weld torch, which enables attachment of additional welding leads for welding current and for preheating current.

Disclosed example submerged arc welding torches contain substantial copper mass in the body of the torch to enable the torch to withstand the same welding parameters and duration of welding as conventional submerged arc welding torches having significantly more copper mass.

As used herein, the word "exemplary" means "serving as an example, instance, or illustration." The embodiments described herein are not limiting, but rather are exemplary only. It should be understood that the described embodiments are not necessarily to be construed as preferred or advantageous over other embodiments. Moreover, the terms "embodiments of the invention," "embodiments," or "invention" do not require that all embodiments of the invention include the discussed feature, advantage, or mode of operation.

As utilized herein the terms "circuits" and "circuitry" refer to physical electronic components (i.e. hardware) and any software and/or firmware (code) that may configure the hardware, be executed by the hardware, and/or otherwise be associated with the hardware. As used herein, for example, a particular processor and memory may comprise a first "circuit" when executing a first set of one or more lines of code and may comprise a second "circuit" when executing a second set of one or more lines of code. As utilized herein, "and/or" means any one or more of the items in the list joined by "and/or". As an example, "x and/or y" means any element of the three-element set $\{(x), (y), (x, y)\}$. In other words, "x and/or y" means "one or both of x and y." As another example, "x, y, and/or z" means any element of the seven-element set $\{(x), (y), (z), (x, y), (x, z), (y, z), (x, y, z)\}$. In other words, "x, y, and/or z" means "one or more of x, y and z". As utilized herein, the term "exemplary" means serving as a non-limiting example, instance, or illustration. As utilized herein, the terms "e.g." and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by an operator-configurable setting, factory trim, etc.).

As used herein, a wire-fed welding-type system refers to a system capable of performing welding (e.g., gas metal arc welding (GMAW), gas tungsten arc welding (GTAW), sub-merged arc welding (SAW), etc.), brazing, cladding, hard-facing, and/or other processes, in which a filler metal is provided by a wire that is fed to a work location, such as an arc or weld puddle.

As used herein, a welding-type power source refers to any device capable of, when power is applied thereto, supplying welding, cladding, plasma cutting, induction heating, laser (including laser welding and laser cladding), carbon arc cutting or gouging and/or resistive preheating, including but not limited to transformer-rectifiers, inverters, converters, resonant power supplies, quasi-resonant power supplies, switch-mode power supplies, etc., as well as control circuitry and other ancillary circuitry associated therewith.

As used herein, preheating refers to heating the electrode wire prior to a welding arc and/or deposition in the travel path of the electrode wire.

Some disclosed examples describe electric currents being conducted "from" and/or "to" locations in circuits and/or power supplies. Similarly, some disclosed examples describe "providing" electric current via one or more paths, which may include one or more conductive or partially conductive elements. The terms "from," "to," and "providing," as used to describe conduction of electric current, do not necessitate the direction or polarity of the current. Instead, these electric currents may be conducted in either direction or have either polarity for a given circuit, even if an example current polarity or direction is provided or illustrated.

Disclosed example SAW torches include: a first contact tip configured to transfer weld current and preheating current to the electrode wire; a second contact tip configured to conduct the preheating current to the electrode wire; an air-cooled first conductive body portion configured to receive the weld current and to conduct the weld current and the preheating current to the first contact tip; an air-cooled second conductive body portion configured to receive the preheating current and to conduct the preheating current to the second contact tip; and an insulator coupled between the first conductive body portion and the second conductive body portion.

In some examples, the first conductive body portion includes a first power connector and the second conductive body portion includes a second power connector. In some examples, the first power connector and the second power connector are configured to be aligned in an axial direction of the first conductive body portion and the second conductive body portion. In some examples, the insulator includes: a first thread configured to couple the insulator to a second thread on the first conductive body portion; and a third thread configured to couple the insulator to a fourth thread on the second conductive body portion, the first, second, third, and fourth threads configured to align the first power connector and the second power connector in the axial direction of the first conductive body portion and the second conductive body portion.

In some example SAW torches, the insulator includes: a first thread configured to couple the insulator to a second thread on the first conductive body portion; and a third thread configured to couple the insulator to a fourth thread on the second conductive body portion, the first, second, third, and fourth threads configured to position the first power connector on an opposite side of the submerged arc welding torch from the second power connector. In some other examples, the torch is liquid-cooled.

In some example SAW torches, the first conductive body portion and the second conductive body portion comprise copper. In some examples, the insulator comprises ceramic. In some examples, the preheating current may be a voltage-controlled circuit or the preheating current may be a current-controlled circuit. In some examples, wherein the first conductive body portion and the second conductive body portion are configured for cooling through natural convection, without liquid cooling and without forced gas cooling through the interior of the first conductive body portion or the second conductive body portion.

Disclosed example SAW torches include a first contact tip and a second contact tip configured to conduct preheating current through a portion of an electrode wire being fed through the torch; a first conductive body portion configured to conduct the preheating current to the second contact tip; a second conductive body portion configured to receive the preheating current and to conduct the preheating current to the first contact tip; an insulator coupled between the first conductive body portion and the second conductive body portion; and an insulative wire liner positioned within at least one of the first conductive body portion or the second conductive body portion and configured to prevent electrical contact between the electrode wire and an inner bore of the first conductive body portion.

Disclosed example SAW systems include a SAW torch and one or more power supplies. The example SAW torch includes: a first contact tip configured to transfer weld current and preheating current to the electrode wire; a second contact tip configured to conduct the preheating current to the electrode wire; a first conductive body portion configured to receive the weld current and to conduct the weld current and the preheating current to the first contact tip; a second conductive body portion configured to receive the preheating current and to conduct the preheating current to the second contact tip; an insulator coupled between the first conductive body portion and the second conductive body portion; and an insulative wire liner positioned within at least one of the first conductive body portion or the second conductive body portion and configured to prevent electrical contact between the electrode wire and an inner bore of the first conductive body portion. The one or more power supplies are configured to output the weld current and the preheating current to the submerged arc welding torch.

In some example SAW systems, the one or more power supplies are configured to execute at least one of a controlled voltage control loop or a controlled current control loop to control the preheating current. In some examples, the first conductive body portion comprises a first power connector and the second conductive body portion includes a second power connector, and the one or more power supplies are coupled to the first power connector to transfer the weld current and coupled to the second power connector to transfer the preheating current. In some examples, the insulator includes a first thread configured to couple the insulator to a second thread on the first conductive body portion, and a third thread configured to couple the insulator to a fourth thread on the second conductive body portion. In some examples, the insulator comprises ceramic, and the first and second conductive body portions comprise copper.

FIG. 1 illustrates an example mechanized welding system 100 in which a manipulator 102 is used to weld a workpiece using a submerged arc welding (SAW) process. In the example welding system 100, the manipulator 102 is used to weld a workpiece 106 using a SAW torch 108, to which power is delivered by welding equipment 110 via conduit 118 and returned by way of a ground conduit 120. The welding equipment 110 may include one or more power sources (each generally referred to herein as a "power supply"), a source of a granular flux, a wire feeder, and other devices. Other devices may include, for example, water coolers, fume extraction devices, one or more controllers, sensors, user interfaces, communication devices (wired and/or wireless), etc.

The welding system 100 of FIG. 1 forms a weld (e.g., at weld joint 112) between two components in a weldment using the SAW process, which involves automated or semi-automated external metal filler (e.g., via a wire feeder). In the example of FIG. 1, the welding system 100 pre-heats the wire prior to delivering the wire to an arc between the wire and the pool, and/or using one or more trail arc torches that deliver the pre-heated wire to a weld pool formed via the arc. The welding equipment 110 may be arc welding equipment having one or more power supplies, and associated circuitry, that provides a direct current (DC), alternating current (AC), or a combination thereof to an electrode wire 114 of a welding torch (e.g., SAW torch 108). The electrode wire 114 may be tubular-type electrode, a solid type wire, a flux-core wire, a seamless metal core wire, SAW wire, self-shielded wire, and/or any other type of electrode wire.

In the welding system 100, the manipulator 102, which is operatively coupled to welding equipment 110 via conduit 118 and ground conduit 120, controls the location of the welding torch 108 and operation of the electrode wire 114 (e.g., via a wire feeder) by manipulating the welding torch 108 and triggering the starting and stopping of the current flow (whether a preheat current and/or welding current) to the electrode wire 114 by sending, for example, a trigger signal to the welding equipment 110. When welding current is flowing, a welding arc is developed between the electrode wire 114 and the workpiece 106, which ultimately produces a weldment. The conduit 118 and the electrode wire 114 thus deliver welding current and voltage sufficient to create the electric welding arc between the electrode wire 114 and the workpiece 106. At the point of welding between the electrode wire 114 and the workpiece 106, the welding arc locally melts the workpiece 106 and electrode wire 114 supplied to the weld joint 112, thereby forming a weld joint 112 when the metal solidifies. At least a portion of the granular flux used in the SAW process is melted and forms a slag layer over the weld joint 112.

Figure 2:
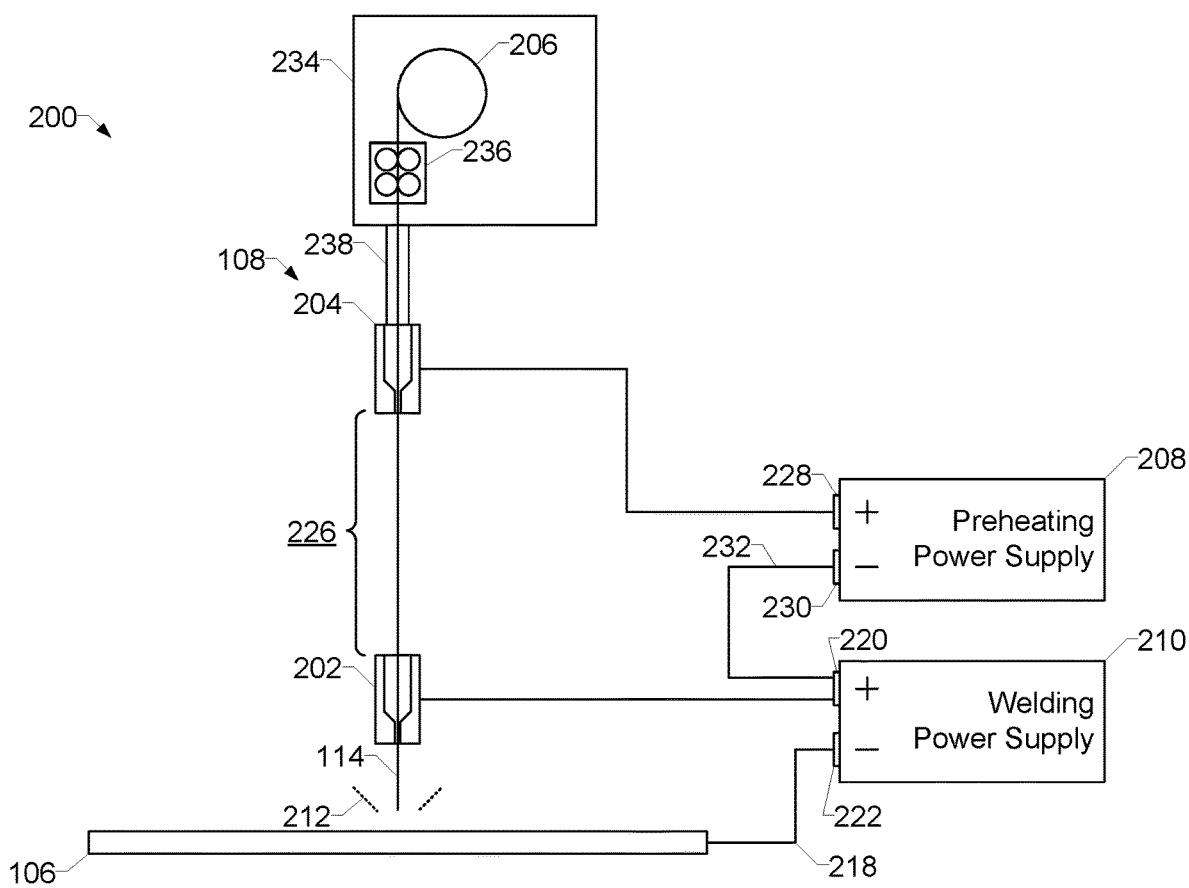
FIG. 2 is a block diagram of an example welding system, in accordance with aspects of this disclosure.

FIG. 2 illustrates a block diagram of an example welding system 200 that may be used to implement the welding system 100 of FIG. 1. The welding system 200 includes the SAW torch 108 having a first contact tip 202 and a second contact tip 204. The system 200 further includes the electrode wire 114 fed from a wire spool 206, a preheating power supply 208, and a welding power supply 210. The system 200 is illustrated in operation as producing a welding arc 212 between the electrode wire 114 and a workpiece 106.

In operation, the electrode wire 114 passes from the wire spool 206 through the second contact tip 204 and the first contact tip 202, between which the preheating power supply 208 generates a preheating current to heat the electrode wire 114. Specifically, in the configuration shown in FIG. 2, the preheating current enters the electrode wire 114 via the second contact tip 204 and exits via the first contact tip 202. The example preheating power supply 208 may implement a controlled voltage control loop or a controlled current control loop to control the voltage and/or current output to the preheating circuit.

At the first contact tip 202, a welding current may also enter the electrode wire 114. The welding current is generated, or otherwise provided by, the welding power supply 210. The welding current exits the electrode wire 114 via the workpiece 106, which in turn generates the welding arc 212. When the electrode wire 114 makes contact with a target metal workpiece 106, an electrical circuit is completed and the welding current flows through the electrode wire 114, across the metal work piece(s) 106, and returns to the welding power supply 210. The welding current causes the electrode wire 114 and the parent metal of the work piece(s) 106 in contact with the electrode wire 114 to melt, thereby joining the work pieces as the melt solidifies. By preheating the electrode wire 114, a welding arc 212 may be generated with drastically reduced arc energy. Generally speaking, the preheating current is proportional to the distance between the contact tips 202, 204 and the electrode wire 114 size.

The welding current is generated, or otherwise provided by, a welding power supply 210, while the preheating current is generated, or otherwise provided by, the preheating power supply 208. The preheating power supply 208 and the welding power supply 210 may ultimately share a common power source (e.g., a common generator or line current connection), but the current from the common power source is converted, inverted, and/or regulated to yield the two separate currents—the preheating current and the welding current. For instance, the preheat operation may be facilitated with a single power source and associated converter circuitry, in which case three leads may extend from a single power source.

During operation, the system 200 establishes a welding circuit to conduct welding current from the welding power supply 210 to the first contact tip 202, and returns to the power supply 210 via the welding arc 212, the workpiece 106, and a work lead 218. To enable connection between the welding power supply 210 and the first contact tip 202 and the workpiece 106, the welding power supply 210 includes terminals 220, 222 (e.g., a positive terminal and a negative terminal).

During operation, the preheating power supply establishes a preheating circuit to conduct preheating current through a section 226 of the electrode wire 114. To enable connection between the preheating power supply 208 and the contact tips 202, 204, the preheating power supply 208 includes terminals 228, 230. The preheating current flows from the preheating power supply 208 to the second contact tip 204, the section 226 of the electrode wire 114, the first contact tip 202, and returns to the preheating power supply 208 via a cable 232 connecting the terminal 220 of the welding power supply 210 to the terminal 230 of the preheating power supply 208.

Because the preheating current path is superimposed with the welding current path over the connection between the first contact tip 202 and the power supplies 208, 210, the cable 232 may enable a more cost-effective single connection between the first contact tip 202 and the power supplies 208, 210 (e.g., a single cable) than providing separate connections for the welding current to the first contact tip 202 and for the preheating current to the first contact tip 202. In other examples, the terminal 230 of the preheating power supply 208 is connected to the first contact tip 202 via a separate path than the path between the first contact tip 202 and the welding power supply 210.

As illustrated in FIG. 2, the example system 100 includes a wire feeder 234 that feeds the electrode wire 114 to the torch 108 using a wire drive 236. The electrode wire 114 exits the wire feeder 234 and travels through a wire liner 238.

Figure 3:
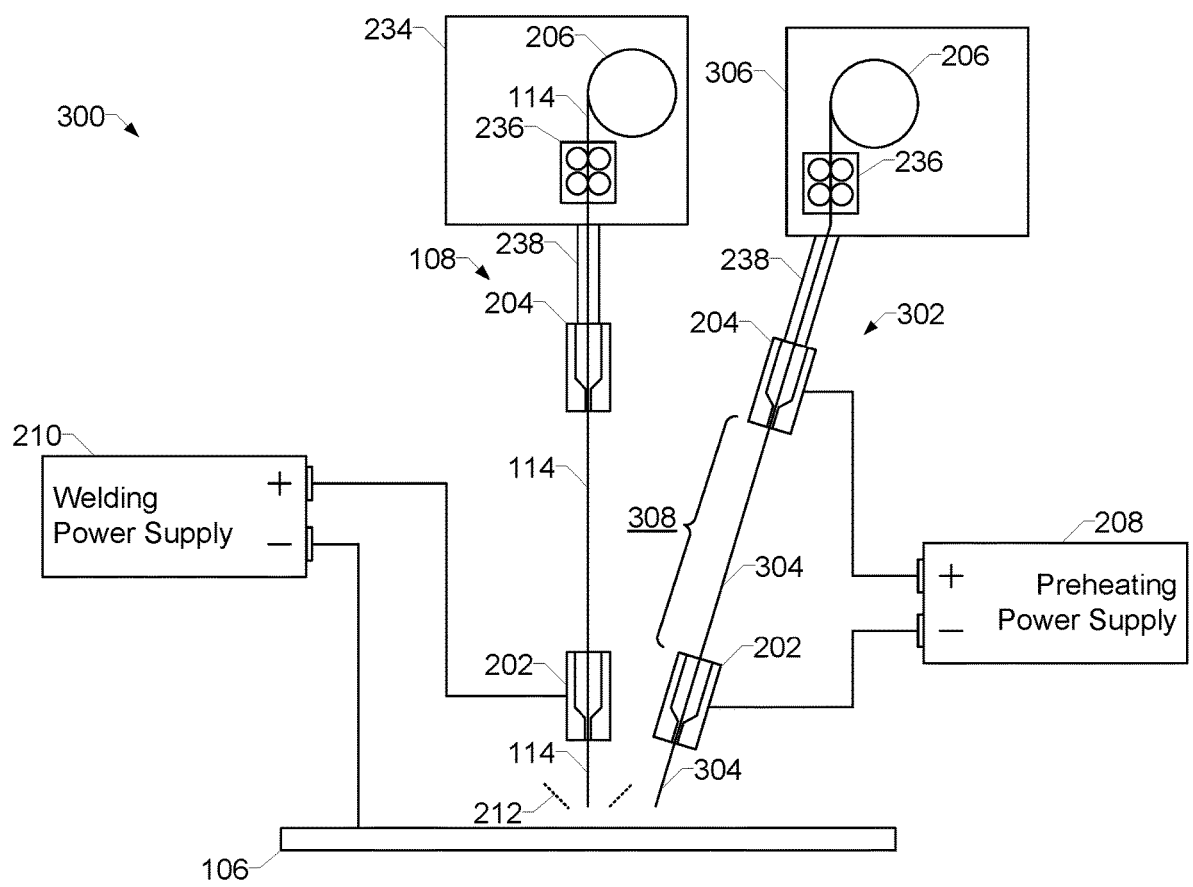
FIG. 3 is a block diagram of another example welding system including a submerged arc welding torch and a trail arc, in accordance with aspects of this disclosure.

FIG. 3 is a block diagram of another example welding system 300 including the SAW torch 108 and a trail arc torch 302. The trail arc torch 302 is positioned forward of the SAW torch 108 or aft of the SAW torch 108 in a direction of travel of the SAW torch 108. The example trail arc torch 302 preheats wire and provides the wire to the weldment without arcing. In some examples, the trail arc torch 302 is provided with a clamp circuit to keep the voltage between the trail arc torch 302 and the workpiece 106 to less than an arcing voltage (e.g., less than 14V).

The trail arc torch 302 is supplied with electrode wire 304 by a wire feeder 306. In the example of FIG. 3, the trail arc torch 302 may be identical of the SAW torch 108, in that both torches 108, 302 include two contact tips 202, 204, such that the contact tip 204 of the SAW torch 108 is unused. Additionally, the example wire feeder 306 is identical to the wire feeder 234. In other examples, the torch 108 is replaced with a conventional SAW torch and includes only a single contact tip to conduct welding current to the electrode wire 114.

As mentioned above, the SAW torch 302 includes contact tips 202, 204, which are coupled to the preheating power supply 208 to preheat a section 308 of the electrode wire 304. The SAW torch 302 preheats the electrode wire 304, which is then deposited adjacent the weld puddle created by the arc 212. The residual heat in the weld puddle, combined with the heat added to the electrode wire 304 by the SAW torch 302, is sufficient to melt the electrode wire 304 and thereby increase deposition of the system 300.

While the example torches 108, 302 are shown in a trailing configuration, the example SAW torches 108, 302 may be configured as a tandem system, a twin wire system, and/or using any other multiple-torch SAW configuration.

Figure 4:
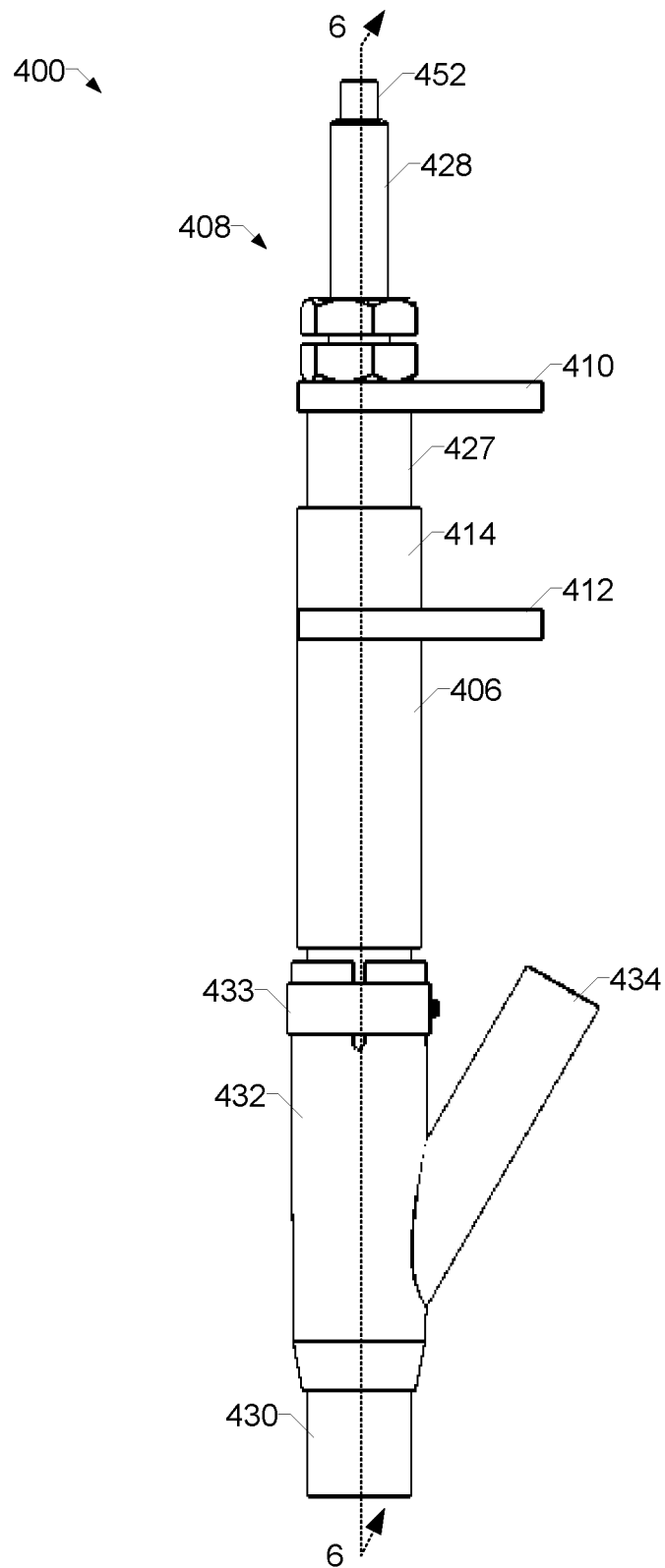
FIG. 4 is an elevation view of an example submerged arc welding torch configured to preheat an electrode wire, in accordance with aspects of this disclosure.
Figure 5:
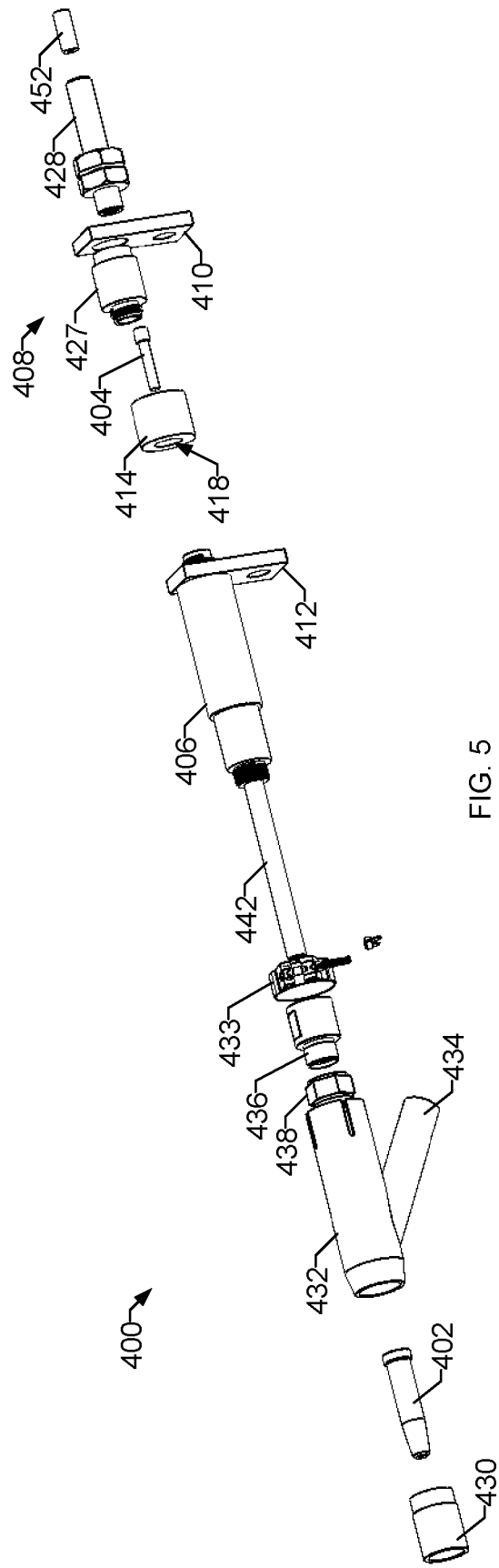
FIG. 5 is an exploded view of the example submerged arc welding torch of FIG. 4.
Figure 6:
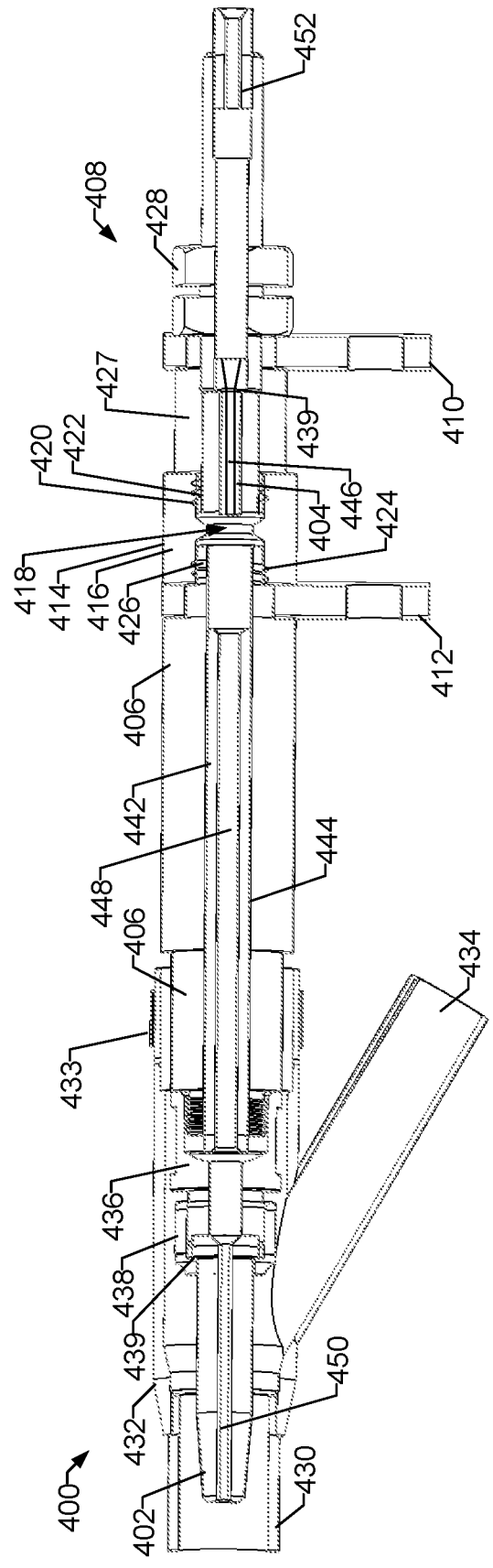
FIG. 6 is a cross-section view of the example submerged arc welding torch of FIG. 4.

FIG. 4 is an elevation view of an example SAW torch 400 configured to preheat an electrode wire (e.g., the electrode wire 114 of FIGS. 1-3). FIG. 5 is an exploded view of the example SAW torch 400 of FIG. 4. FIG. 6 is a cross-section view of the example SAW torch 400 of FIG. 4. The example SAW torch 400 of FIGS. 4-6 may be used to implement the SAW torch 108 and/or the SAW torch 302 of FIGS. 2 and/or 3.

The example SAW torch 400 includes a first contact tip 402 (FIG. 5), a second contact tip 404 (FIG. 5), a first conductive body portion 406, and a second conductive body portion 408. The first contact tip 402 transfers weld current and/or the preheating current to the electrode wire 114, and the second contact tip 404 conducts preheating current to the electrode wire 114. For example, the preheating current flows between the first and second contact tips 402, 404 via the electrode wire 114.

The second conductive body portion 408 receives the preheating current and conducts the preheating current to the second contact tip 404. The first conductive body portion 406 receives the welding current and conducts the welding current and the preheating current to (and/or from) the first contact tip 402. As discussed above, the first contact tip 402, the electrode wire 114, and the second contact tip 404 form a portion of a preheating circuit to conduct preheating current through the electrode wire 114. The second conductive body portion 408 includes a power connector 410 and the first conductive body portion 406 includes a power connector 412. The power connectors 410, 412 may be used to couple a weld cable for delivery of the welding current and/or the preheating current. The power connectors 410, 412 may be arranged to permit the cables to be routed away from the torch without interference with other parts of the system 200.

The torch 400 further includes an insulator 414, which is coupled between the second conductive body portion 408 and the first conductive body portion 406. In the illustrated example, the insulator 414 includes a ceramic body 416 having a bore 418 extending lengthwise along the body 416. The insulator 414 includes a first thread 420 to couple the insulator 414 to a thread 422 on the second conductive body portion 408, and a second thread 424 to couple the insulator 414 to a thread 426 on the first conductive body portion 406.

The threads 420, 422, 424, and 426 may be configured to align the power connectors 410, 412 in the axial direction of the torch 400 (e.g., the axial direction of the body portions 406, 408). In some other examples, the threads 420, 422, 424, and 426 are configured to offset the power connectors 410, 412 circumferentially around the torch 400 (e.g., partially offset, positioned on opposite sides of the SAW torch 400 from each other). Depending on the cable arrangements in the welding system 100, having the power connectors 410, 412 aligned or offset may permit routing of the weld current and/or preheating current cables to reduce or avoid interference with moving components.

The second conductive body portion 408 includes a connector 427, the power connector 410, and a mounting stud 428. The connector 427 includes the threads 422, and is coupled to the insulator 414. The connector 427, the power connector 410, and the mounting stud 428 may be brazed together, threaded, or otherwise mechanically and electrically attached. The mounting stud 428 receives the contact tip 404 via the connector 427, and secures the second contact tip 404 to the torch 400. The connector 427, the power connector 410, and/or the mounting stud 428 are constructed using copper or other thermally conductive material to dissipate heat from the second contact tip 404.

The first conductive body portion 406 conducts current between the contact tip 402 and the power connector 412, and dissipates heat from the first contact tip 402, a nozzle 430, and/or a granular flux disperser 432. The first conductive body portion 406 is constructed using copper or other thermally conductive material to dissipate heat from the first contact tip 402 and/or the preheated wire traveling through the torch 400.

The granular flux disperser 432 includes a granular flux input port 434, which may be connected to a source of granular flux. The granular flux disperser 432 permits deposition of the granular flux, via the nozzle 430, to a volume adjacent the weld path. Because of the proximity to the arc, the first contact tip 402, the nozzle 430, and/or the granular flux disperser 432 may be subjected to substantial heat, which is transferred to the first conductive body portion 406 for dissipation. The granular flux disperser 432 is connected to the first conductive body portion 406 via a collar 433, which may be tightened or loosened to secure or remove, respectively, the granular flux disperser 432 from the torch 400.

A contact tip extender 436 is coupled to the first conductive body portion 406, and holds the first contact tip 402 in the contact tip extender 436. A contact tip nut 438 is threaded onto the contact tip extender 436, and includes a shoulder 439 to secure the first contact tip 402 in electrical contact with the contact tip extender 436.

The example SAW torch 400 includes an insulative wire liner 442 positioned in an inner bore 444 of the first conductive body portion 406. The electrode wire 114 is directed through an inner bore 446 of the second contact tip 404, an inner bore 448 of the insulative wire liner 442, and an inner bore 450 of the first contact tip 402 as the insulative wire liner 442 prevents electrical contact between the electrode wire 114 and an inner bore 444 of the first conductive body portion 406. As a result, electrical contact occurs between the electrode wire 114 and the first contact tip 402, and between the electrode wire 114 and the second contact tip 404, without intervening contact. The first contact tip 402, the second contact tip 404, and the electrode wire 114 form a part of an electrode preheating circuit.

As illustrated in FIGS. 4-6, the electrode wire 114 is fed into the welding torch 400 via a wire outlet guide 452.

The example SAW torch 400 is gas-cooled or air-cooled, in that the conductive body portions 406, 408 dissipate heat to the surrounding environment. As used herein, "air-cooled" refers to cooling through natural convection, without liquid cooling and without forced gas cooling through the interior of the torch body. Air-cooling may include external forcing of air and/or gas toward the exterior of the torch, such as by directing an air flow (e.g., a fan or blower) toward the torch.

In other examples, the SAW torch 400 is liquid cooled, such as by routing cooling liquid on the interior, exterior, and/or internals of the components of the SAW torch 400. For example, the first conductive body portion 406 and/or the second conductive body portion 408 may include fluid cooling channels. In other examples, fluid cooling lines may be wrapped around the first conductive body portion 406 and/or the second conductive body portion 408, in thermal communication but electrically isolated from the preheating and/or welding circuits.

Figure 7:
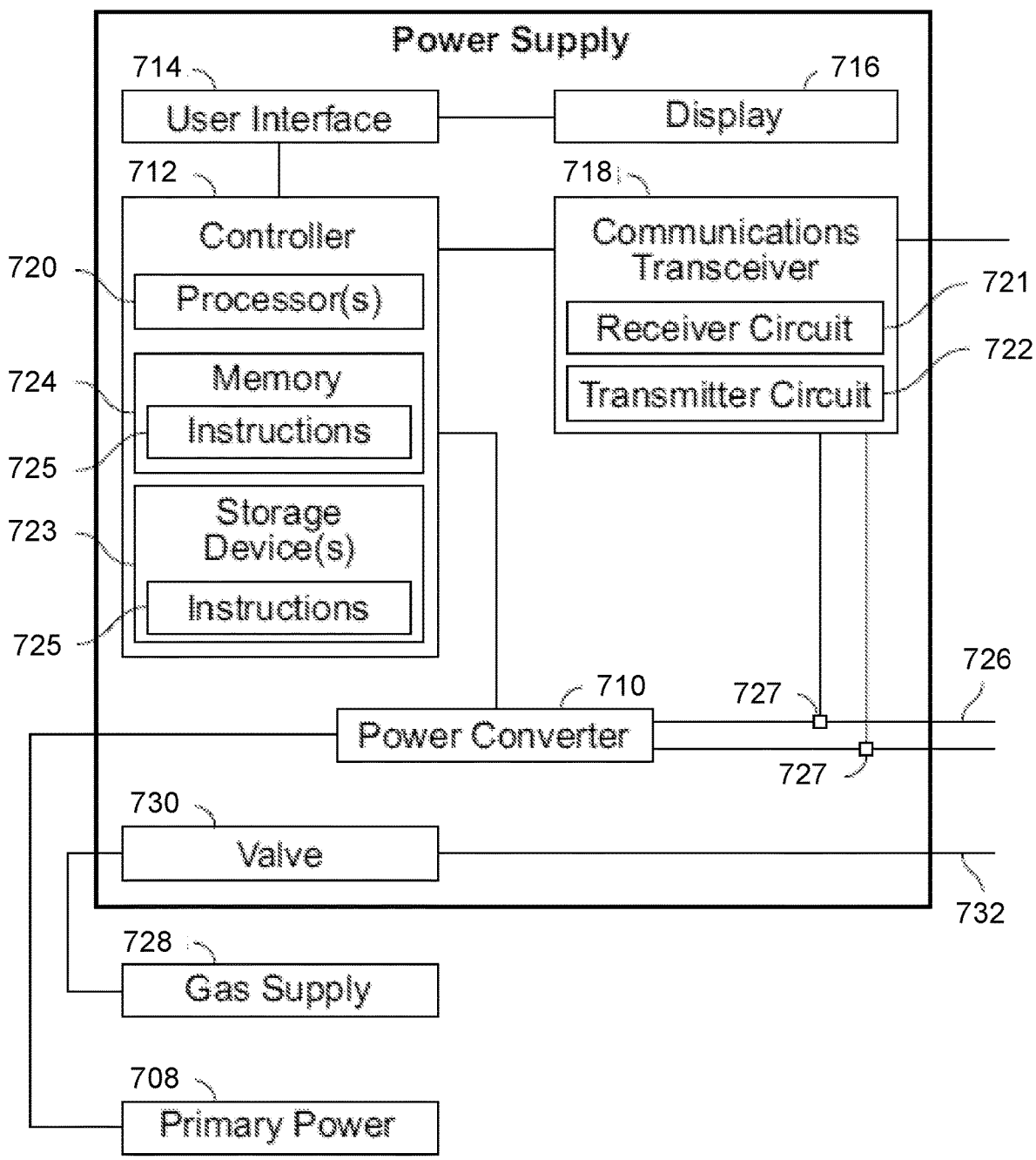
FIG. 7 is a block diagram of an example implementation of the power supplies of FIGS. 2 and 3.

FIG. 7 is a block diagram of an example implementation of the power supplies 208, 210 of FIGS. 2 and/or 3. The example power supply 208, 210 powers, controls, and supplies consumables to a welding application. In some examples, the power supply 208, 210 directly supplies input power to the welding torch 108. In the illustrated example, the power supply 208, 210 is configured to supply power to welding operations and/or preheating operations. The example power supply 208, 210 also provides power to a wire feeder to supply the electrode wire 114 to the welding torch 108 for various welding applications (e.g., GMAW welding, flux core arc welding (FCAW), SAW).

The power supply 208, 210 receives primary power 708 (e.g., from the AC power grid, an engine/generator set, a battery, or other energy generating or storage devices, or a combination thereof), conditions the primary power, and provides an output power to one or more welding devices and/or preheating devices in accordance with demands of the system. The primary power 708 may be supplied from an offsite location (e.g., the primary power may originate from the power grid). The power supply 208, 210 includes a power converter 710, which may include transformers, rectifiers, switches, and so forth, capable of converting the AC input power to AC and/or DC output power as dictated by the demands of the system (e.g., particular welding processes and regimes). The power converter 710 converts input power (e.g., the primary power 708) to welding-type power based on a weld voltage setpoint and outputs the welding-type power via a weld circuit.

In some examples, the power converter 710 is configured to convert the primary power 708 to both welding-type power and auxiliary power outputs. However, in other examples, the power converter 710 is adapted to convert primary power only to a weld power output, and a separate auxiliary converter is provided to convert primary power to auxiliary power. In some other examples, the power supply 208, 210 receives a converted auxiliary power output directly from a wall outlet. Any suitable power conversion system or mechanism may be employed by the power supply 208, 210 to generate and supply both weld and auxiliary power.

The power supply 208, 210 includes a controller 712 to control the operation of the power supply 208, 210. The power supply 208, 210 also includes a user interface 714. The controller 712 receives input from the user interface 714, through which a user may choose a process and/or input desired parameters (e.g., voltages, currents, particular pulsed or non-pulsed welding regimes, and so forth). The user interface 714 may receive inputs using any input device, such as via a keypad, keyboard, buttons, touch screen, voice activation system, wireless device, etc. Furthermore, the controller 712 controls operating parameters based on input by the user as well as based on other current operating parameters. Specifically, the user interface 714 may include a display 716 for presenting, showing, or indicating, information to an operator. The controller 712 may also include interface circuitry for communicating data to other devices in the system, such as the wire feeder. For example, in some situations, the power supply 208, 210 wirelessly communicates with other welding devices within the welding system. Further, in some situations, the power supply 208, 210 communicates with other welding devices using a wired connection, such as by using a network interface controller (NIC) to communicate data via a network (e.g., ETHERNET, 10baseT, 10base100, etc.). In the example of FIG. 7, the controller 712 communicates with the wire feeder via the weld circuit via a communications transceiver 718.

The controller 712 includes at least one controller or processor 720 that controls the operations of the welding power supply 208, 210. The controller 712 receives and processes multiple inputs associated with the performance and demands of the system. The processor 720 may include one or more microprocessors, such as one or more "general-purpose" microprocessors, one or more special-purpose microprocessors and/or ASICS, and/or any other type of processing device. For example, the processor 720 may include one or more digital signal processors (DSPs).

The example controller 712 includes one or more storage device(s) 723 and one or more memory device(s) 724. The storage device(s) 723 (e.g., nonvolatile storage) may include ROM, flash memory, a hard drive, and/or any other suitable optical, magnetic, and/or solid-state storage medium, and/or a combination thereof. The storage device 723 stores data (e.g., data corresponding to a welding application), instructions (e.g., software or firmware to perform welding processes), and/or any other appropriate data. Examples of stored data for a welding application include an attitude (e.g., orientation) of a welding torch, a distance between the contact tip and a workpiece, a voltage, a current, welding device settings, and so forth.

The memory device 724 may include a volatile memory, such as random access memory (RAM), and/or a nonvolatile memory, such as read-only memory (ROM). The memory device 724 and/or the storage device(s) 723 may store a variety of information and may be used for various purposes. For example, the memory device 724 and/or the storage device(s) 723 may store processor executable instructions 725 (e.g., firmware or software) for the processor 720 to execute. In addition, one or more control regimes for various welding processes, along with associated settings and parameters, may be stored in the storage device 723 and/or memory device 724, along with code configured to provide a specific output (e.g., initiate wire feed, enable gas flow, capture welding current data, detect short circuit parameters, determine amount of spatter) during operation.

In some examples, the welding power flows from the power converter 710 through a weld cable 726. The example weld cable 726 is attachable and detachable from weld studs at each of the power supply 208, 210 (e.g., to enable ease of replacement of the weld cable 726 in case of wear or damage). Furthermore, in some examples, welding data is provided with the weld cable 726 such that welding power and weld data are provided and transmitted together over the weld cable 726. The communications transceiver 718 is communicatively coupled to the weld cable 726 to communicate (e.g., send/receive) data over the weld cable 726. The communications transceiver 718 may be implemented based on various types of power line communications methods and techniques. For example, the communications transceiver 718 may utilize IEEE standard P1901.2 to provide data communications over the weld cable 726. In this manner, the weld cable 726 may be utilized to provide welding power from the power supply 208, 210 to the wire feeder and the welding torch 108. Additionally or alternatively, the weld cable 726 may be used to transmit and/or receive data communications to/from the wire feeder and the welding torch 108. The communications transceiver 718 is communicatively coupled to the weld cable 726, for example, via cable data couplers 727, to characterize the weld cable 726, as described in more detail below. The cable data coupler 727 may be, for example, a voltage or current sensor.

In some examples, the power supply 208, 210 includes or is implemented in a wire feeder.

The example communications transceiver 718 includes a receiver circuit 721 and a transmitter circuit 722. Generally, the receiver circuit 721 receives data transmitted by the wire feeder via the weld cable 726 and the transmitter circuit 722 transmits data to the wire feeder via the weld cable 726. As described in more detail below, the communications transceiver 718 enables remote configuration of the power supply 208, 210 from the location of the wire feeder and/or compensation of weld voltages by the power supply 208, 210 using weld voltage feedback information transmitted by the wire feeder 234, 306. In some examples, the receiver circuit 721 receives communication(s) via the weld circuit while weld current is flowing through the weld circuit (e.g., during a welding-type operation) and/or after the weld current has stopped flowing through the weld circuit (e.g., after a welding-type operation). Examples of such communications include weld voltage feedback information measured at a device that is remote from the power supply 208, 210 (e.g., the wire feeder) while the weld current is flowing through the weld circuit Example implementations of the communications transceiver 718 are described in U.S. Pat. No. 9,012,807. The entirety of U.S. Pat. No. 9,012,807 is incorporated herein by reference. However, other implementations of the communications transceiver 718 may be used.

The example wire feeder 234 also includes a communications transceiver 719, which may be similar or identical in construction and/or function as the communications transceiver 718.

In some examples, a gas supply 728 provides shielding gases, such as argon, helium, carbon dioxide, and so forth, depending upon the welding application. The shielding gas flows to a valve 730, which controls the flow of gas, and if desired, may be selected to allow for modulating or regulating the amount of gas supplied to a welding application. The valve 730 may be opened, closed, or otherwise operated by the controller 712 to enable, inhibit, or control gas flow (e.g., shielding gas) through the valve 730. Shielding gas exits the valve 730 and flows through a cable 732 (which in some implementations may be packaged with the welding power output) to the wire feeder which provides the shielding gas to the welding application. In some examples, the power supply 208, 210 does not include the gas supply 728, the valve 730, and/or the cable 732.

The present devices and/or methods may be realized in hardware, software, or a combination of hardware and software. The present methods and/or systems may be realized in a centralized fashion in at least one computing system, processors, and/or other logic circuits, or in a distributed fashion where different elements are spread across several interconnected computing systems, processors, and/or other logic circuits. Any kind of computing system or other apparatus adapted for carrying out the methods described herein is suited. A typical combination of hardware and software may be a processing system integrated into a welding power supply with a program or other code that, when being loaded and executed, controls the welding power supply such that it carries out the methods described herein. Another typical implementation may comprise an application specific integrated circuit or chip such as field programmable gate arrays (FPGAs), a programmable logic device (PLD) or complex programmable logic device (CPLD), and/or a system-on-a-chip (SoC). Some implementations may comprise a non-transitory machine-readable (e.g., computer readable) medium (e.g., FLASH memory, optical disk, magnetic storage disk, or the like) having stored thereon one or more lines of code executable by a machine, thereby causing the machine to perform processes as described herein. As used herein, the term "non-transitory machine readable medium" is defined to include all types of machine readable storage media and to exclude propagating signals.

An example control circuit implementation may be a microcontroller, a field programmable logic circuit and/or any other control or logic circuit capable of executing instructions that executes weld control software. The control circuit could also be implemented in analog circuits and/or a combination of digital and analog circuitry.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. A submerged arc welding torch, comprising:
    a first contact tip configured to transfer weld current and preheating current to the electrode wire;
    a second contact tip configured to conduct the preheating current to the electrode wire;
    an air-cooled first conductive body portion configured to receive the weld current at a first power connector and to conduct the weld current and the preheating current to the first contact tip;

an air-cooled second conductive body portion configured to receive the preheating current at a second power connector and to conduct the preheating current to the second contact tip; and an insulator configured to detachably connect the first conductive body portion to the second conductive body portion and to electrically insulate the first conductive body portion from the second conductive body portion while connected.

2. The submerged arc welding torch as defined in claim 1, wherein the first power connector is at an end of the first conductive body portion that is adjacent to the insulator, and the second power connector is at an end of the second conductive body portion that is farther from the insulator.

3. The submerged arc welding torch as defined in claim 2, wherein the first power connector and the second power connector are configured to be aligned in an axial direction of the first conductive body portion and the second conductive body portion.

4. The submerged arc welding torch as defined in claim 3, wherein the insulator is configured to mechanically couple the first conductive body portion and the second conductive body portion to align the first power connector and the second power connector in the axial direction of the first conductive body portion and the second conductive body portion.

5. The submerged arc welding torch as defined in claim 2, wherein the insulator is configured to mechanically couple the first conductive body portion and the second conductive body portion to position the first power connector on an opposite side of the submerged arc welding torch from the second power connector.

6. The submerged arc welding torch as defined in claim 1, further comprising an insulative wire liner positioned within at least one of the first conductive body portion or the second conductive body portion and configured to prevent electrical contact between the electrode wire and an inner bore of the first conductive body portion.

7. The submerged arc welding torch as defined in claim 1, wherein the first conductive body portion and the second conductive body portion are configured for cooling through natural convection, without liquid cooling and without forced gas cooling through the interior of the first conductive body portion or the second conductive body portion.

8. The submerged arc welding torch as defined in claim 1, wherein the first conductive body portion and the second conductive body portion comprise copper.

9. The submerged arc welding torch as defined in claim 1, wherein the insulator comprises ceramic.

10. The submerged arc welding torch as defined in claim 1, wherein the preheating current is a voltage-controlled circuit.

11. The submerged arc welding torch as defined in claim 1, wherein the preheating current is a current-controlled circuit.

12. A submerged arc welding torch, comprising:
a first contact tip and a second contact tip configured to conduct preheating current through a portion of an electrode wire being fed through the torch;
an air-cooled first conductive body portion configured to conduct the preheating current to the second contact tip via a first power connector;
an air-cooled second conductive body portion configured to receive the preheating current via a second power connector and to conduct the preheating current to the first contact tip;
an insulator mechanically coupling the first conductive body portion to the second conductive body portion and electrically insulating the first conductive body portion from the second conductive body portion, wherein the insulator is configured to guide the electrode wire from the first conductive body portion to the second conductive body portion; and
a wire guide extending through the first conductive body portion, the insulator, and the second conductive body portion.

13. The submerged arc welding torch as defined in claim 12, wherein the insulator comprises ceramic, and the first and second conductive body portions comprise copper.

14. A submerged arc welding system, comprising:
a submerged arc welding torch, comprising:
a first contact tip configured to transfer weld current and preheating current to the electrode wire;
a second contact tip configured to conduct the preheating current to the electrode wire;
an air-cooled first conductive body portion configured to receive the weld current at a first power connector and to conduct the weld current and the preheating current to the first contact tip;
an air-cooled second conductive body portion configured to receive the preheating current at a second power connector and to conduct the preheating current to the second contact tip; and
an insulator configured to detachably connect the first conductive body portion to the second conductive body portion and to electrically insulate the first conductive body portion from the second conductive body portion while connected; and
one or more power supplies configured to output the weld current and the preheating current to the submerged arc welding torch.

15. The submerged arc welding system as defined in claim 14, wherein the one or more power supplies are configured to execute at least one of a controlled voltage control loop or a controlled current control loop to control the preheating current.

16. The submerged arc welding system as defined in claim 14, wherein the first power connector is at an end of the first conductive body portion that is adjacent to the insulator, and the second power connector is at an end of the second conductive body portion that is farther from the insulator.

17. The submerged arc welding system as defined in claim 16, wherein the first power connector and the second power connector are configured to be aligned in an axial direction of the first conductive body portion and the second conductive body portion.

18. The submerged arc welding system as defined in claim 14, wherein the insulator comprises ceramic, and the first and second conductive body portions comprise copper.

* * * * *